US010573286B2

(12) United States Patent
Wenzloff et al.

(10) Patent No.: US 10,573,286 B2
(45) Date of Patent: Feb. 25, 2020

(54) MUSIC EFFECT PEDAL

(71) Applicant: M-WAVE MUSIC PRODUCTS, LLC, Glendale Heights, IL (US)

(72) Inventors: Bill Albert Wenzloff, Crystal Lake, IL (US); Scott David Fietsam, Algonquin, IL (US)

(73) Assignee: M-WAVE MUSIC PRODUCTS, LLC, Glendale Heights, IL (US)

( * ) Notice: Subject to any disclaimer, the term of this patent is extended or adjusted under 35 U.S.C. 154(b) by 0 days.

(21) Appl. No.: 15/868,538

(22) Filed: Jan. 11, 2018

(65) Prior Publication Data

US 2018/0197515 A1 Jul. 12, 2018

Related U.S. Application Data

(60) Provisional application No. 62/445,181, filed on Jan. 11, 2017.

(51) Int. Cl.
*G10H 1/34* (2006.01)
*G10H 1/00* (2006.01)
*B32B 7/12* (2006.01)
*B32B 7/02* (2019.01)

(52) U.S. Cl.
CPC ............ *G10H 1/348* (2013.01); *B32B 7/02* (2013.01); *B32B 7/12* (2013.01); *G10H 1/0008* (2013.01); *B32B 2307/412* (2013.01); *B32B 2307/422* (2013.01); *G10H 2210/155* (2013.01); *G10H 2210/231* (2013.01)

(58) Field of Classification Search
CPC ..... G10H 2210/231; G10H 1/32; G10H 1/348
USPC .................... 84/644, 670, 721, 746
See application file for complete search history.

(56) References Cited

U.S. PATENT DOCUMENTS

| 3,749,810 | A | * | 7/1973 | Dow | A63J 17/00 84/701 |
|---|---|---|---|---|---|
| 4,738,180 | A | * | 4/1988 | McKnight | F16M 11/00 206/314 |
| 7,259,340 | B2 | | 8/2007 | Blaha et al. | |
| 7,498,498 | B2 | * | 3/2009 | Lerner | G10D 13/00 84/411 R |
| 8,680,390 | B2 | * | 3/2014 | McMillen | G10H 1/348 84/746 |
| 8,763,802 | B2 | * | 7/2014 | Ellis-Brown | G06F 1/1628 206/320 |
| 9,075,404 | B2 | * | 7/2015 | McMillen | G10H 1/348 |
| 9,475,514 | B2 | | 10/2016 | Hardy et al. | |
| 9,546,921 | B2 | * | 1/2017 | McMillen | G10H 1/348 |
| 2003/0036412 | A1 | * | 2/2003 | Chong | H04M 1/72519 455/566 |
| 2005/0142371 | A1 | * | 6/2005 | Swain | B32B 25/08 428/516 |

(Continued)

FOREIGN PATENT DOCUMENTS

CN 105793390 A 7/2016

OTHER PUBLICATIONS

Morley (https://www.youtube.com/watch?v=_1hOkqpk_48 uploaded to YouTube on Dec. 3, 2009; viewed online on Aug. 17, 2018.*

(Continued)

*Primary Examiner* — David S Warren
(74) *Attorney, Agent, or Firm* — Schroeder Intellectual Property Law Group, LLC

(57) ABSTRACT

A method of coating a music effect pedal with a phosphorescent coating.

10 Claims, 2 Drawing Sheets

(56) References Cited

U.S. PATENT DOCUMENTS

| | | | | |
|---|---|---|---|---|
| 2006/0040081 | A1* | 2/2006 | Hodsdon | G09F 3/02 428/40.1 |
| 2006/0065099 | A1* | 3/2006 | Anderson | G10D 13/022 84/411 M |
| 2006/0174749 | A1* | 8/2006 | Lerner | G10D 13/00 84/419 |
| 2007/0128972 | A1* | 6/2007 | Schmidt | A63H 33/22 446/219 |
| 2008/0060507 | A1 | 3/2008 | Welchering | |
| 2008/0264235 | A1* | 10/2008 | Lerner | G10D 13/00 84/419 |
| 2009/0277321 | A1* | 11/2009 | Sturch | G09B 5/06 84/477 R |
| 2011/0088536 | A1* | 4/2011 | McMillen | G10H 1/348 84/746 |
| 2012/0118772 | A1* | 5/2012 | Ellis-Brown | G06F 1/1628 206/320 |
| 2014/0222243 | A1* | 8/2014 | McMillen | G10H 1/348 700/301 |
| 2015/0316434 | A1* | 11/2015 | McMillen | G10H 1/348 345/174 |
| 2016/0030835 | A1* | 2/2016 | Argiro | A63F 13/02 463/33 |
| 2017/0167931 | A1* | 6/2017 | McMillen | G10H 1/348 |
| 2017/0241620 | A1* | 8/2017 | Aivazi | H01H 9/02 |
| 2018/0197515 | A1* | 7/2018 | Wenzloff | G10H 1/348 |
| 2019/0219465 | A1* | 7/2019 | McMillen | G01L 1/18 |

OTHER PUBLICATIONS

Morley PWO-GLO Power Wah Glow Series Guitar Effects Pedal, accessed at http://www.musiciansfriend.com/amplifiers-effects/morley-pwo-glo-power-wah-glow-series-guitar-effects-pedal#productDetail on Mar. 28, 2017, 3 pages.

Earthquaker Devices Ghost Echo Reverb Limited Edition Glow-in-the-Dark, accessed at http://www.chicagomusicexchange.com/products/earthquaker-devices-ghost-echo-reverb-limited-edition-white-grey on Mar. 28, 2017, 2 pages.

Rat 2, accessed at http://ratdistortion.com/products/rat2 on Mar. 28, 2017, 2 pages.

MXR CL1 Classic Overdrive Guitar Effects Pedal, accessed at http://www.guitarcenter.com/MXR/CL1-Classic-Overdrive-Guitar-Effects-Pedal-1274228082124.gc on Mar. 28, 2017, 5 pages.

Coffin Case BDFX-1 Blood Drive Distortion Pedal, accessed at http://www.musicground.com/p/527701/used-coffin-case-bdfx-1-blood-drive-distortion-pedal on Mar. 28, 2017, 2 pages.

Goo, accessed at http://www.toneconcepts.com/goo/#product on Mar. 28, 2017, 7 pages.

Gloknob, accessed at http://optionknowb.com/gloknob on Mar. 28, 2017, 2 pages.

Starglow Pedal Finders, accessed at http://www.glowtec.co.uk/glow-in-the-dark-pedal-markers.htm on Mar. 28, 2017, 3 pages.

Peppermint Fuzz, accessed at http:www.analogman.com/pepper.htm on Mar. 28, 2017, 5 pages.

Glowbee Clear, accessed at https://www.prismaticpowders.com/shop/powder-coating-colors/PPB-4617/glowbee-clear, 2 pages.

* cited by examiner

MUSIC EFFECT PEDAL

RELATED APPLICATIONS

The present application claims the filing benefit of U.S. Provisional Patent App. No. 62/445,181 filed Jan. 11, 2017, the contents of which is fully incorporated herein by reference.

FIELD OF THE INVENTION

The present invention relates to music effects pedals, and more specifically music effects pedals used for stage shows in varying light conditions.

BACKGROUND OF THE INVENTION

During live music performances, musicians utilize various effects devices to enhance their playing and performance. One field of commonly used effects devices are effects pedals. Effects pedals may be positioned on the floor and accessed and operated by musicians during a show. Wah wah pedals, for example, are pedals which are positioned on the floor, proximate the foot of a guitar player which can be activated by stepping on a treadle (or an associated button on the base of the pedal) to utilize the effect on a guitar played in association therewith.

The location of any pedals, particularly those positioned on the floor, is critical for two reasons. First, everyone on stage needs to be able to easily identify and see the pedal in order to avoid running into the pedal which may damage the pedal or cause a musician on stage to be injured. Second, the musician utilizing the pedal needs to be able to locate the pedal to activate any associated effects during the performance. In the case of pedals which are located on the floor and require a musician to step on them to activate the pedal, being able to identify the correct place on the pedal to step to avoid slipping and insure that the pedal is properly activated can be crucial.

While in some instances identifying and locating any pedals may be easy, in conditions of varying light, or in particular where the musician is performing in low light or even lights out or no light conditions, locating a pedal, particularly one located on the floor or around other musical equipment, can be very difficult. In order to combat the effects of low light or now light and make sure that pedals are more easily identified during a performance, musicians employ numerous techniques.

One such technique which is currently used by musicians is to place adhesive strips or elements, like for example glow-in-the-dark tape or stickers, to a portion or particular areas of the pedal so that it can be identified on stage in low light conditions. While tape or stickers can be effective for periods of time, elements which are temporarily adhered to the pedals can be rubbed off or removed from the pedal, or lose adhesion and fall off. Removal of the tape may cause musicians on stage to lose sight of the pedal, which may cause a musician to trip and fall over a pedal or may make it difficult for a musician to use a pedal. If the tape is pulled off and remains on stage proximate the pedal, a musician may misidentify the location of the pedal, increasing the possibility of an accident with the closely located, but now less visible pedal. If the tape remains fixed to the pedal, but has moved from a location where a musician is supposed to step to activate the pedal to a different position for example, a musician may not be able to identify the proper location to activate the pedal, making it difficult for the musician to properly utilize the pedal or even step on the pedal in a way which causes the musician to fall or be injured on the pedal.

A technique which has been used by Applicant for the present application, for example, is to apply screen ink on various parts or elements of the pedal after the pedal has been manufactured and otherwise painted or coated. Utilizing screening ink, however, can be labor intensive and quite expensive, particularly when large areas of a pedal are to be covered.

There is a long-felt need for a solution, whereby musicians can locate, identify and fully utilize effects pedals in all light conditions on a stage, without concerns of any identifying material being removed or repositioned during a performance, while creating such pedals in the most efficient manner possible. The present invention aims to solve this need.

SUMMARY OF THE INVENTION

The present invention is directed to a music effect pedal and a method of coating a music effect pedal in order to provide a pedal which glows-in-the-dark, emitting a phosphorescent glow, with the glow-in-the-dark, phosphorescent portion being formed as part of the pedal coating and/or part of a pedal component structure.

According to one aspect of the invention, a method of coating a music effect pedal is provided. A phosphorescent coating is applied to a portion of a music effect. A coating of a first material may be applied to at least a portion of the music effect pedal, and a coating of a second material may be applied to the same portion of the music effect pedal over the first material with the second material being the phosphorescent coating. The first material may be, for example a powdercoating material or powdercoat which is adhered directly to the metal or other material used to form the pedal. In order to observe the first material, the second material may be clear. Making the second material clear will allow any phosphorescent glow emitted by the second coat to be in the color of the first material.

The first material and the second material may be applied to any portion of the music effect pedal. For example, the first material and the second material may be applied to a base of the music effect pedal, to a treadle or other actuator element of the music effect pedal or to both a portion or all of the base and a portion or all of the treadle or other actuator element of the music effect pedal.

According to another aspect of the invention, regardless of which portion of the music effect pedal the first and second materials are applied to, a paper having a phosphorescent side and an adhesive side may be adhered to the treadle of the music effect pedal and a clear non-slip material be applied over the paper adhered to the treadle. An image may be printed or screened in reverse onto the phosphorescent side of the paper.

According to one aspect of the invention, a music effects pedal may be coated by adhering a paper having a phosphorescent side and an adhesive side to a treadle of a music effect pedal with a sheet of clear non-slip material over the paper adhered to the treadle. The use of the paper and non-slip material may be done on its own, irrespective of any coating. An image may be printed or screened in reverse onto the phosphorescent side of the paper.

According to one aspect of the invention, a music effect pedal is provided. The music pedal may include a base and a treadle or other actuator element. The music effect pedal includes a phosphorescent coating material which is applied to a portion of one or more of the base or the actuation element. The music effect pedal may have a first layer of coating material on a portion of one or more of the base or the treadle or other actuator element, and a second layer of coating material on top of the first layer of coating material, the second layer of coating material being the phosphorescent coating material. The first layer of coating material may be, for example a powdercoating material or a powdercoat. The second layer of coating material may be clear. Making the second material clear will allow any phosphorescent glow emitted by the phosphorescent coating material to be in the color of the first material. The first layer of coating material and the second layer of coating material may be applied to a portion of one or both of the base and the treadle or other actuation element.

According to another aspect of the invention, a paper having a phosphorescent side and an adhesive side may be used to coat a treadle or other actuator element of the pedal, with the adhesive side being adhered to the treadle or other actuator element. A sheet of clear non-slip material may be adhered to the treadle or other actuator element over the paper. An image may be printed or screened in reverse onto the phosphorescent side of the paper.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

Figure 1:
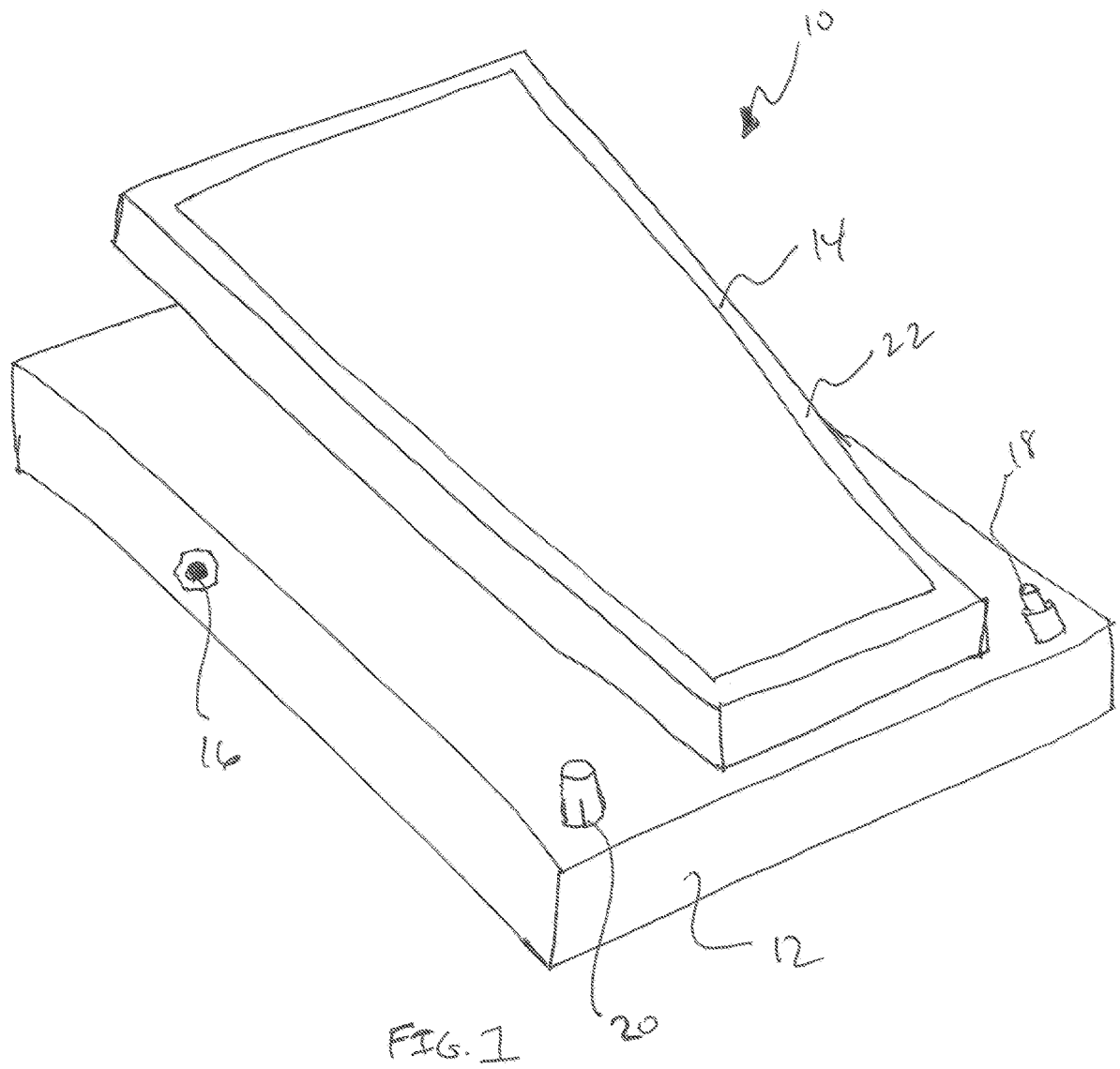
FIG. 1 shows an embodiment of a music effect pedal of the present invention.

While the present invention is susceptible of embodiment in many different forms, there is shown in the drawings and will herein be described in detail several preferred embodiments of the invention with the understanding that the present disclosure is to be considered as an exemplification of the principles of the invention and is not intended to limit the broad aspect of the invention to the embodiments illustrated.

FIG. 1 shows a music effect pedal 10 having a base portion 12 and an actuator element in the form of treadle 14 operatively coupled thereon. Pedal 10 may further include various connection ports 16 for connecting the pedal to an instrument, amplifier or other equipment, as well as any buttons 18, knobs 20 or activation devices to control any effects produced by the pedal, including but not limited to modifying the effect produced by the pedal or the overall volume or amplitude of any effect produced by the pedal.

As shown in FIG. 1, pedal 10 will be discussed herein with respect to components of a foot activated pedal having a treadle, however it should be understood that the coating methods and resulting music pedal discussed herein may be utilized for any music pedal regardless of the configuration or type of pedal. For example, rather than have a treadle, music effects pedals may have various buttons or knobs which may be utilized to activate the pedal and produce any desired effects. The advantages of the present may be realized and applied to any pedal type.

Insofar as music effect pedal 10 may take the form of known music pedals, like for example a wah wah pedal as shown in FIG. 1, the construction of the pedal will not be discussed herein. Once constructed, music effect pedal 10 may be coated as follows in order to provide a semi-permanent or permanent pedal coating which will be viewable in varying and in particular low light or lights out conditions.

At least one layer of a first material may be adhered to a portion or all of music effect pedal 10. The first material may be a powdercoat or other paint or coloring material, and may be applied to some or all of base 12 and/or treadle 14 once pedal 10 is constructed. Once at least one layer of the first material is applied, a coating of a second, glow-in-the-dark phosphorescent material is applied overtop the first material, to the same portion or portions of pedal 10 as the first material. In order to allow for the viewing of any colors or designs provided by the first material, the second material may be clear.

By providing a clear, phosphorescent second material coating over the first material, any portions of pedal 10 which are coated in the second material will emit a phosphorescent glow in the color or pattern of the first material applied to the pedal when the second material is charged and placed in low light conditions. For example, if a red color is used for the first material, a clear phosphorescent coating which has been applied over the first material will emit a red glow when charged and placed in a low-light or no light environment. By applying the phosphorescent element as a coating directly onto at least a portion of the pedal, the present invention provides a method which solves the problems associated with music pedals set forth at the outset. Rather than provide a temporary, i.e. easily displaced, phosphorescent element like tape or stickers, or requiring a labor-intensive process like screen printing ink over portions of the pedal, the coating method of the present invention provides a relatively permanent coating to the pedal so that the pedal can be readily seen and identified in varying light conditions, and in particular low light or no light conditions.

In order to provide for enhanced usage of pedal 10 in low light conditions, it is contemplated that the first material may be applied in different colors or patterns when the second material is a clear, phosphorescent material. For example, rather than provide a single uniform color over any portion of the pedal coated in the first material, multiple colors may be used so that a user can readily identify, access and/or activate certain portions of a pedal as necessary, particularly in low light or no light conditions.

For example, base 12 of pedal 10 may be substantially coated in a first color, while the area directly surrounding port 16 may be coated in a second color, the area directly surrounding button 18 may be coated in a third color and the area directly surrounding volume control 20 may be coated in a fourth color. Of course, rather than or in addition to the area surrounding any element, any port, button, knob, control or other actuation element may be directly coated in a distinct color as well. The entire base (and any coated elements) may then coated in a clear, phosphorescent second material. Once the second material is charged and the pedal placed in a low light or lights out environment, the second material will glow, with each individual color glowing in its location as applied to the pedal. In the example given herein, a substantial portion of base 12 will glow in the first color, while the area immediately proximate input and/or output port(s) 16 of the pedal will glow in the second color, the area immediately proximate effects button 18 will glow in the third color and the area immediately proximate volume control 20 will glow in the fourth color. By utilizing different colors, the expanse of the entire pedal can be visually seen by users and any other individuals on stage in any light condition, while the individual elements on the pedal can be quickly located and activated or utilized as necessary.

It is of course contemplated that rather than use two layers of material to coat pedal 10, at least one layer of phosphorescent material may be utilized to coat a portion or all of the pedal so that the phosphorescent effect is realized with just a single coating material on the pedal rather than two coatings. Where a single phosphorescent coating is utilized rather than coatings of two separate coating materials, the color emitted by the coating may be that of the coating itself (if not clear), or the color of the pedal itself underneath the coating. While some ability to control emission color may be sacrificed in such embodiments, the effect of having a pedal which has a semi-permanent coating which will glow-in-the-dark will still be realized by such embodiments. In such embodiments, a portion or all of the base, treadle or other actuation element, or portions or all of both, may be coated with the phosphorescent coating material only, providing the necessary glow without any additional coatings being required.

In addition to or instead of the base and any elements associated therewith being coated with the first and second material, treadle 14 or other primary actuation element may be coated in substantially the same manners as the base and any elements associate therewith.

Figure 2:
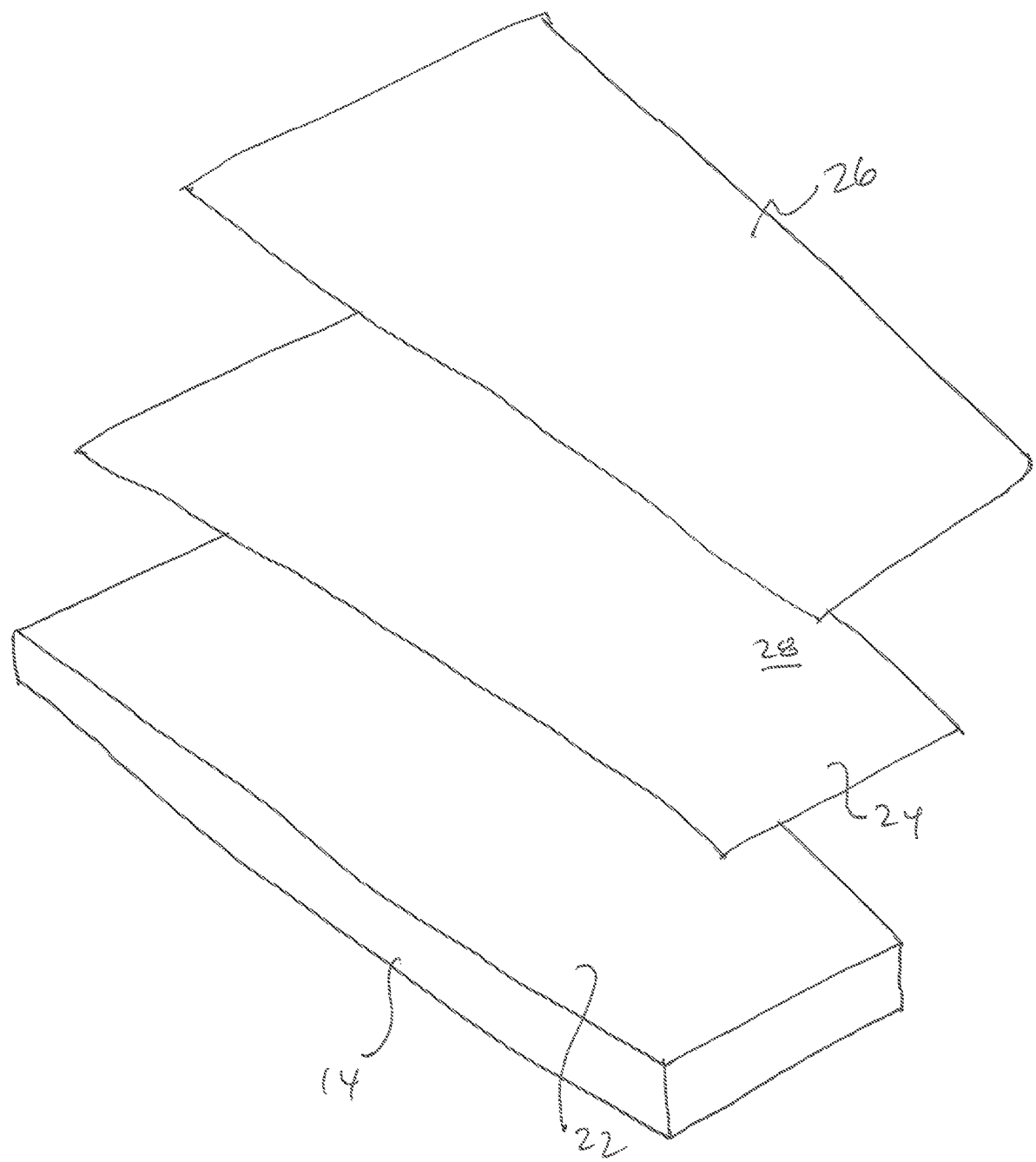
FIG. 2 shows an exploded view of an embodiment of a treadle according to the present invention.

Rather than, or in addition to, coating the treadle or a portion of the treadle in the manners discussed herein, treadle 14 may be coated in full or in part by adhering different layers of material to top surface 22 of the treadle. FIG. 2 shows an exploded view of a treadle coated in this manner.

As seen in FIG. 2, rather than, or in addition to, a portion or all of the treadle 14 being coated in the first and second material, treadle 14 may have a layer of paper 24 adhered to top surface 22, with layer of non-slip or high traction material 26 adhered over paper 24.

Paper 24 may have a first adhesive side (under side of paper 24 in FIG. 2) which adheres to top surface 22, and a second side 28 which is phosphorescent and exposed once the paper is adhered to the treadle. It should be understood that the adhesive side of paper 24 may have an adhesive element formed directly thereon, or alternatively the adhesive side of the paper may be have no adhesion element directly thereon and instead be adhered to top surface 22 using an adhesive applied to the treadle or paper, by chemically bonding the paper to the treadle or by manipulating a portion of the treadle or the adhesion side of the paper to bond the paper to the top surface.

Any images, designs or lettering can be printed or screened on the phosphorescent side of the paper. By utilizing phosphorescent paper and printing, areas of activation can be more easily provided with any desired images, designs and/or lettering than can be done with powder coating insofar as the image can be directly applied to the paper, and with the phosphorescence optionally becoming part of the image, design or lettering.

Any images, designs and lettering, as well as phosphorescent glow in low light or lights out conditions, can be made viewable through layer of non-slip or high traction material 26 if the layer of non-slip or high traction material is clear. Using a clear material for the layer of non-slip or high traction material will insure that any images, designs or lettering, as well as any exposed or uncovered portion of phosphorescent side 28, is visible in all light conditions while providing a non-slip surface on which a user can step or otherwise activate an associated pedal.

As a further alternative embodiment, it is contemplated by the invention that a portion or the entire pedal may have phosphorescent paper adhered thereto, with a clear coating, non-slip, high traction or otherwise, applied over the paper to prevent the paper from falling off or otherwise disengaging from the pedal. For example, a portion or all of base 12 and a portion or all of treadle 14 (or other actuation element) may have phosphorescent paper adhered thereto with a clear coat applied over the entire effect pedal over top any adhered phosphorescent paper.

As with different colors being used in different locations with the first material, different colored papers could be used for the base and treadle or other actuator element, for example. Because of the ease with which patterns may be printed on the paper, different patterns, images, designs or lettering could also be realized on different portions of the pedal.

Different clear coatings could also be applied to different portions of the pedal as needed. For example, any portion of the pedal which may be stepped on for activation of the pedal, like for example a treadle, could be covered in a clear, non-slip or high traction material. Portions which are not ordinarily meant to be stepped on like the base of the pedal, may be coated in any ordinary clear coating, regardless of its friction characteristics.

By adhering phosphorescent paper and a clear coating over the entire pedal, the phosphorescent paper will remain in place so the pedal can be easily identified and utilized in low light or not light conditions, while maximum designability of the pedal appearance.

It is to be understood that additional embodiments of the present invention described herein may be contemplated by one of ordinary skill in the art and the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A method of coating music effects pedal comprising the steps of
   adhering a paper having a phosphorescent side to a portion of a music effect pedal; and
   applying a sheet of clear material over the paper adhered to the portion of the music effect pedal.

2. The method of claim 1 further comprising the step of printing or screening an image in reverse onto the phosphorescent side of the paper.

3. The method of claim 1 wherein the paper is adhered to a treadle of the music effect pedal.

4. The method of claim 3 wherein the sheet of clear material is a non-slip material.

5. A music effect pedal comprising:
   a base;
   an actuation element;
   a phosphorescent coating material, the phosphorescent coating material being applied to a portion of one or more of the base or the actuation element;
   a paper having a phosphorescent side, the paper being adhered to the actuation element; and
   a sheet of clear non-slip material being adhered to the actuation element, over the paper.

6. The music effect pedal of claim 5 further comprising
a first layer of coating material being applied to a portion of one or more of the base or the actuation element;
a second layer of coating material on top of the first layer of coating material, the second layer of coating material being the phosphorescent coating material.

7. The music effect pedal of claim 6 wherein the first layer of coating material is a powdercoating material.

8. The music effect pedal of claim 7 wherein the second layer of coating material is clear.

9. The music effect pedal of claim 6 wherein the first layer of coating material and the second layer of coating material are applied to a portion of the base and to a portion of the actuation element.

10. The music effect pedal of claim 5 wherein the actuation element is a treadle.

\* \* \* \* \*